Patented Mar. 22, 1938

2,112,162

UNITED STATES PATENT OFFICE 2,112,162

MANUFACTURE OF SUBSTITUTED MALONIC ESTERS

John David Kendall, Ilford, England, assignor to Ilford Limited, Ilford, Essex, England, a British company No Drawing. Application May 18, 1936, Serial No. 80,461. In Great Britain May 25, 1935

13 Claims. (Cl. 260—38)

This invention relates to the manufacture of meso-substituted malonic esters.

In the provisional specification No. 36,247/33 which forms part of British Patent No. 431,141, and in the complete specification of that patent, inter alia a process is described for the production of a meso-substituted malonic ester having the following formula:

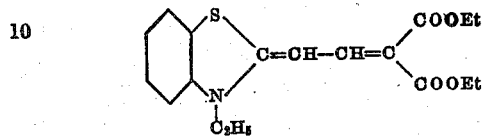

by reacting 1-acetanilido-vinyl benzthiazole and diethyl malonate in the presence of pyridine, and it is indicated that this compound has sensitizing properties for photographic silver chloride emulsions.

It has now been found that other analogous meso-substituted malonic esters may be produced and that these esters are sensitizers for silver chloride and other silver halide photographic emulsions, and it is an object of the present invention to produce a series of such meso-substituted malonic esters typified by the above example. The main distinction of the process of the present invention from the process described in the specifications of British Patent No. 431,141 resides in the fact that instead of using an unsubstituted malonic ester such as diethyl malonate as one of the starting materials, a meso-substituted malonic ester is employed.

According to the present invention a process for the production of meso-substituted malonic esters comprises reacting in the presence of an acid binding substance, such as pyridine, or a strong base such as sodium ethoxide one molecular proportion of a quaternary salt of a heterocyclic nitrogen compound having a reactive methyl group with one molecular proportion of a meso-substituted malonic ester in which the substituent group is one of the following: hydroxymethylene, alkoxymethylene, arylaminomethylene, acylarylaminomethylene and aminomethylene.

It is believed that the quaternary salt reacts with the substituted malonic ester in the manner shown by the following equation, in which Y represents the remainder of the heterocyclic nitrogen compound, R represents an alkyl group and X represents an acid radical:

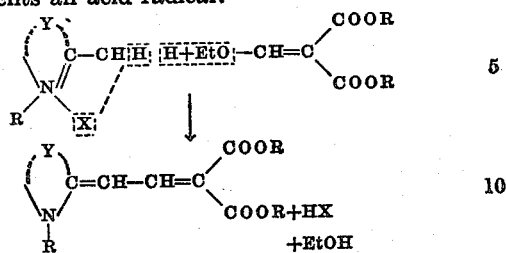

The ethoxymethylene malonic ester given in the above general equation is one of the most convenient meso-substituted malonic esters which may be employed in the process of the present invention, but other alkoxy methylene malonic esters may be employed, and also malonic esters having other substituent groups, for example hydroxymethylene malonic ester, arylaminomethylene malonic ester, e. g. anilido-methylene malonic ester, acylarylamino-methylene malonic ester, e. g. acetanilido methylene malonic ester, and aminomethylene malonic ester. The preparation of malonic esters containing as a meso-substituent an arylaminomethylene, an acylarylaminomethylene or an aminomethylene group is described in a paper by Claisen in Annalen volume 297, page 76 et seq.

Quaternary salts of any of the heterocyclic nitrogen compounds which are normally employed in the preparation of cyanine dyes may be employed in carrying out the process of the present invention, for example thiazoles, oxazoles, quinolines, selenazoles, quinazolines, diazines, pyridimines and their homologues and substituent derivatives, including the corresponding benz- and naphtho-compounds.

As already indicated the meso-substituted malonic esters obtained in accordance with the present invention are sensitizers for photographic silver halide emulsions, and one or more of the compounds may be incorporated in a photographic silver halide emulsion, in accordance with known practice, either by mixing with the emulsion before it is coated on a support or by bathing the coated support in a solution of the compound.

Several specific examples of the process of the present invention are given below by way of example only in order to illustrate the invention.

Example I

*Preparation of 1.3.3-trimethyl-indolylidine-2-ethylidene malonic-diethyl-ester*

30 gms. of trimethylindolenine methiodide, 25 gms. of ethoxymethylene-malonic ester and 100 ccs. of pyridine were heated together under a reflux condenser for one hour and the mixture was then poured into 1 litre of water. A yellow dye separated out, and was filtered off, washed and recrystallized from methyl alcohol to give yellow crystals.

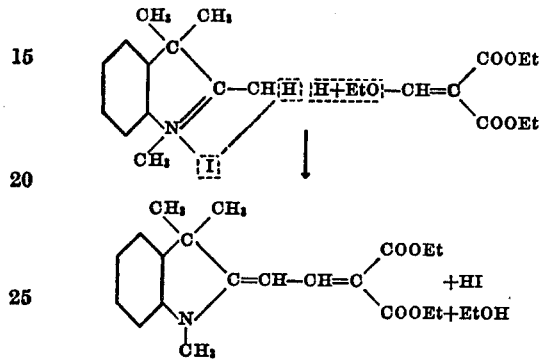

Example II

*Preparation of 2-ethyl dihydro-benzthiazolylidine-1-ethylidene-malonic-diethyl-ester*

30.5 gms. of 1-methyl-benzthiazole-ethiodide, 25 gms. of ethoxymethylene-malonic-diethyl-ester and 120 ccs. of pyridine were mixed together and heated under a reflux condenser for one hour. The mixture was then poured into 1 litre of water when a yellow dye separated out. This was collected, washed and recrystallized from benzene to give pale yellow needles of a dyestuff similar to that from the condensation of 1-acetanilidovinyl-benzthiazole-ethiodide with diethyl-malonate.

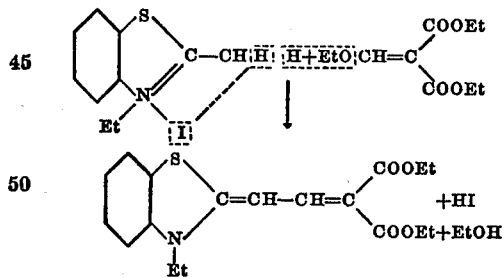

Example III

*Preparation of N-methyl-dihydro-benzthiazolylidine 2-ethylidene malonic ethyl ester*

14.9 gms. of 1-methylbenzthiazole were heated with 18.6 gms. of methyl-p-toluene sulphonate for 2½ hours at 140°–150° C. 21.6 gms. of ethoxymethylene-malonic ester were then added together with 70 ccs. of pyridine and the whole gently boiled for a further 50 minutes. A reddish-orange solution was obtained which was poured into one litre of water when a brown crystalline deposit was formed. This was purified by boiling out with benzene and recrystallizing from spirit to yield a yellowish solid melting at 119° C.

Example IV

*Preparation of N-methyl-dihydro-benzoxazolylidine 2-ethylidene malonic ethyl ester*

13.3 gms. of 1-methylbenzoxazole were heated together with 18.6 gms. of methyl-p-toluene sulphonate for 2½ hours at 140–150° C. 21.6 gms. of ethoxymethylene malonic ester and 60 ccs. of pyridine were then added and the mixture boiled gently for a further 50 minutes. The mixture was then poured into water and the precipitate formed was extracted with benzene and recrystallized from spirit to form long light yellow needles melting at 155° C.

Example V

*N-methyldihydroquinolylidene-2-ethylidene-malonic-diethyl-ester*

20 gms. of quinaldine were heated with 26 gms. of methyl-p-toluene sulphonate for four hours at 120°–130° C.

31 gms. of ethoxymethylene-malonic-diethyl-ester were then added together with 100 ccs. pyridine and the mixture was boiled for about forty-five minutes.

The liquor was then diluted with a large bulk of water and allowed to stand. Green crystals separated out and were dissolved in hot benzene and filtered from a small quantity of insoluble matter. On concentration of the solution and cooling, the dye separated out as large brown rhomboids (melting point 123° C.) which were soluble in ether, alcohol and benzene to give a deep orange yellow solution.

Example VI

*N-methyldihydroquinolylidene-4-ethylidene-malonic-diethyl-ester*

28.5 gms. lepidine methyl iodide and 21.6 gms. ethoxymethylene - malonic - diethyl - ester were mixed with 100 ccs. pyridine and heated for about 20 minutes. The solution obtained was diluted with water and the pyridine neutralized by the addition of acetic acid when the dyestuff was deposited as deep red brown crystals melting at 210° C. and soluble in the usual organic solvents to give a magenta coloured solution.

Example VII

*N - methyldihydropyridylidene - 2 - ethylidene-malonic-diethyl-ester* was obtained by condensing one molecular proportion of α-picolinemethosulphate and one molecular proportion of ethoxymethylene-malonic-diethyl-ester in the presence of one molecular proportion of sodium ethoxide in alcoholic solution. The dye was a yellow solid giving bright yellow solutions in the usual organic solvent.

Example VIII

*3-N - methylidihydroquinazolylidine - 4 - ethylidene-malonic-diethyl-ester* was obtained by heating 4-methyl-quinazolinemetho-p-toluene sulphonate with ethoxymethylene-malonic-diethyl-ester in the presence of pyridine. The dye gave yellow solutions.

Example IX

*N-methyl-3:4-benzdihydrobenzthiazolylidene-1-ethylidene-malonic-diethyl-ester*

19.9 gms. of 1-methyl-3:4-benzbenzthiazole and 18.6 gms. of methyl-p-toluene sulphonate were heated together for five hours at 160°–170° C. The mixture was allowed to cool and 21.6 gms. of ethoxymethylene-malonic-diethyl-ester followed by 140 ccs. of pyridine were added. The solution was heated under reflux for forty-five minutes and was then diluted with a large bulk of water and the precipitate which formed was filtered off. The slightly oily solid obtained was dissolved in hot benzene and filtered, petroleum ether (40°–60° boiling point) was then added and the dyestuff was precipitated out as fine orange needles, of melting point 158°–159° C., giving a bright yellow solution in organic solvents.

EXAMPLE X

*1-ethyl-6-methyldihydroquinolylidene-2-ethylidene-malonic-diethyl-ester*

A mixture of 31.3 gms. of p-toluquinaldine ethiodide and 21.6 gms. of ethoxy-methylene-malonic-diethyl-ester were heated under reflux for forty-five minutes in the presence of 150 ccs. of pyridine. The solution was diluted with water and acetic acid added to neutralize excess pyridine. On standing red brown crystals with bluish reflex were deposited. These dissolved in organic solvents to give orange yellow solutions.

EXAMPLE XI

*N-methyl-3:4-benzdihydrobenzoxazolylidene-1-ethylidene-malonic-ester*

A mixture of 33.9 gms. of 2-methyl-β-naphthoxazole ethiodide, 21.6 gms. of ethoxymethylene-malonic-diethyl-ester, and 200 ccs. pyridine were boiled under reflux for thirty minutes. The solution on dilution with water and addition of acetic acid to neutralize the pyridine deposited a yellow oil which rapidly hardened. On crystallization from benzene yellow crystals were obtained which dissolved in organic solvents to give lemon yellow solutions.

EXAMPLE XII

*N-methyl-dihydrobenzselenazolylidene-1-ethylidene-malonic-diethyl-ester*

19.6 gms. of 1-methylbenzselenazole and 18.6 gms. of methyl-p-toluene sulphonate were mixed in a 500 ccs. bolthead flask and heated together for four hours at 140°–150° C. After cooling 21.6 gms. of ethoxymethylene-malonic-diethyl-ester and 120 ccs. pyridine were added and the mixture heated under reflux for forty-five minutes. On dilution a solid was deposited which was filtered at the pump and crystallized by solution in hot benzene, filtered hot from insoluble material and allowed to cool. The dye obtained dissolved in organic solvents to give bright yellow solutions.

EXAMPLE XIII

*1:3:3-trimethylindolylidene-2-ethylidene-malonic-diethyl-ester*

A mixture of 9.03 gms. of 2:3:3-trimethylindolenine methiodide, 5.64 gms. of hydroxymethylene-malonic-diethyl-ester and 50 ccs. of pyridine were heated under reflux for thirty minutes. The mixture was diluted with water when a thick oil precipitated which, on solution in a little ethyl alcohol and standing, deposited yellow crystals identical with those obtained using ethoxy-methylene-malonic-diethyl-ester instead of hydroxy methylene-malonic-diethyl-ester.

The same dyestuff was also obtained by heating together an intimate mixture of a molecular proportion of 2:3:3-trimethylindolenine methiodide with a molecular proportion of amino-methylene-malonic-diethyl-ester at 150–160° C. for two hours. The mixture was dissolved up in alcohol and reprecipitated with water, and the above dyestuff was obtained from the semi-solid precipitate by extraction with ether.

The same product was also obtained in a similar manner employing anilido-methylene-malonic diethyl-ester in place of the amino-methylene-diethyl-malonic-ester.

I claim:
1. A process for the production of substituted malonic esters comprising reacting, in the presence of an acid binding substance, one molecular proportion of a quaternary salt of a heterocyclic nitrogen compound having a reactive methyl group with substantially one molecular proportion of a meso-substituted malonic ester in which the substituent group is one selected from the group consisting of hydroxy-methylene, alkoxy-methylene, arylamino-methylene, acylarylamino-methylene and amino-methylene.

2. The process of claim 1 wherein pyridine is employed as the acid binding substance.

3. The process of claim 1 wherein an alcohol is used as the solvent and a strong base is used as the acid binding substance.

4. A process for the production of substituted malonic esters comprising mixing an acid binding substance, one molecular proportion of a quaternary salt of a heterocyclic nitrogen compound having a reactive methyl group and substantially one molecular proportion of a meso-substituted malonic ester in which the substituent group is one selected from the group consisting of hydroxy-methylene, alkoxy-methylene, arylamino-methylene, acylarylamino-methylene and amino-methylene, and heating the mixture under a reflux condenser until reaction has been effected between the quaternary salt of a heterocyclic nitrogen compound and the meso-malonic ester.

5. The process of claim 4 wherein the heating is continued for approximately one hour and the reaction mixture is then poured into water.

6. A process for the production of substituted malonic esters comprising reacting, in the presence of an acid binding substance, one molecular proportion of a quaternary salt of a heterocyclic nitrogen compound having a reactive methyl group with substantially one molecular proportion of an alkoxy-methylene malonic ester.

7. A process for the production of substituted malonic esters comprising reacting, in the presence of an acid binding substance, one molecular proportion of a quaternary salt of a heterocyclic nitrogen compound having a reactive methyl group with substantially one molecular proportion of an ethoxy-methylene malonic ester.

8. A process for the production of substituted malonic esters comprising reacting, in the presence of an acid binding substance, one molecular proportion of a quaternary salt of a heterocyclic nitrogen compound having a reactive methyl group with substantially one molecular proportion of an anilido-methylene malonic ester.

9. A process for the production of 1.3.3-trimethylindolylidine-2-ethylidene malonic-diethyl-ester consisting in reacting, in the presence of an acid binding substance, substantially equimolecular proportions of trimethylindolenine methiodide and ethoxy-methylene-malonic ester.

10. A process for the production of 2-ethyldihydro-benzthiazolylidine-1-ethylidene-malonic-diethyl-ester consisting in reacting, in the presence of an acid binding substance, substantially equimolecular proportions of 1-methyl-benzthiazole-ethiodide and ethoxy-methylene-malonic-diethyl-malonic ester.

11. A process for the production of N-methyl-dihydroquinolylidene-2-ethylidene malonic diethyl ester consisting in reacting, in the presence of an acid binding substance, substantially equimolecular proportions of quinaldine para-toluene sulphonate and ethoxy-methylene-malonic diethyl ester.

12. A process for the production of substituted malonic esters comprising reacting, in the presence of an acid binding substance, one molecular proportion of a quaternary salt of a heterocyclic nitrogen compound of the type used in the preparation of cyanine dyes, having a reactive methyl group with substantially one molecular proportion of a meso-substituted malonic ester in which the substituent group is one selected from the group consisting of hydroxy-methylene, alkoxy-methylene, arylamino-methylene, acylarylamino-methylene and amino-methylene.

13. A process for the production of substituted malonic esters comprising reacting, in the presence of an acid binding substance, one molecular proportion of a quaternary salt of a heterocyclic nitrogen compound of the type used in the preparation of cyanine dyes taken from the class consisting of thiazoles, oxazoles, quinolines, selenazoles, and quinazolines, having a reactive methyl group with substantially one molecular proportion of a meso-substituted malonic ester in which the substituent group is one selected from the group consisting of hydroxy-methylene, alkoxy-methylene, arylamino-methylene, acylarylamino-methylene and amino-methylene.

JOHN DAVID KENDALL.